(12) United States Patent
Suzuki

(10) Patent No.: US 7,118,223 B2
(45) Date of Patent: Oct. 10, 2006

(54) PROJECTION DISPLAYING APPARATUS, IMAGE PROJECTING SYSTEM, AND OPTICAL SYSTEM FOR PROJECTION DISPLAYING APPARATUS

(75) Inventor: Ryuji Suzuki, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 156 days.

(21) Appl. No.: 10/964,328

(22) Filed: Oct. 13, 2004

(65) Prior Publication Data
US 2005/0083489 A1  Apr. 21, 2005

(30) Foreign Application Priority Data
Oct. 16, 2003  (JP) .............. 2003-356632

(51) Int. Cl.
*G03B 21/14* (2006.01)
(52) U.S. Cl. .............. 353/61; 353/60; 353/20
(58) Field of Classification Search .............. 353/57, 353/58, 60, 61, 20; 349/5, 7, 8, 9
See application file for complete search history.

(56) References Cited

U.S. PATENT DOCUMENTS

| 6,033,077 | A * | 3/2000 | Iwase ................. 353/119 |
|---|---|---|---|
| 6,254,238 | B1 * | 7/2001 | Takamatsu ............ 353/61 |
| 6,290,360 | B1 * | 9/2001 | Konuma et al. ........ 353/61 |
| 6,334,686 | B1 * | 1/2002 | Shiraishi et al. ....... 353/57 |
| 2002/0140905 | A1 | 10/2002 | Ouchi et al. |
| 2005/0036115 | A1 * | 2/2005 | Kim et al. ........... 353/61 |
| 2005/0213050 | A1 * | 9/2005 | Suzuki ............... 353/58 |

FOREIGN PATENT DOCUMENTS

| JP | H09-288315 | 11/1997 |
|---|---|---|
| JP | H10-197954 | 7/1998 |
| JP | 2001-154268 | 6/2001 |

* cited by examiner

*Primary Examiner*—William C. Dowling
(74) *Attorney, Agent, or Firm*—Cowan, Liebowitz & Latman, P.C.

(57) ABSTRACT

A projection displaying apparatus projects on a projection plane an image displayed on a reflection displaying device using light emitted from a light source. The projection displaying apparatus includes a wind feeding portion for feeding a cooling wind to a light-incident side of a polarization plate disposed on an optical path from the light source to the reflection displaying device, and a wind guiding portion for guiding the cooling wind such that the cooling wind can be blown on the polarization plate slantingly relative to a light-incident face of the polarization plate.

12 Claims, 8 Drawing Sheets

PROJECTION DISPLAYING APPARATUS, IMAGE PROJECTING SYSTEM, AND OPTICAL SYSTEM FOR PROJECTION DISPLAYING APPARATUS

BACKGROUND OF THE INVENTION

1. Field of the Invention

The present invention relates to a projection displaying apparatus (for example, a liquid crystal projector) using a reflection displaying device (for example, a reflection liquid crystal panel), and an optical system (i.e., an optical engine) usable in a projection displaying apparatus. Particularly, the present invention relates to techniques of cooling a polarization plate.

2. Background of the Invention

As a conventional technology, Japanese Patent Application Laid-Open Nos. H9-288315 and H10-197954 disclose a liquid crystal projector using a transmission displaying device (a transmission liquid crystal panel), in which a polarization plate is disposed on an optical path between a condenser lens and the transmission liquid crystal panel, being away from each of them. More specifically, the polarization plate disclosed in the Japanese Patent Application Laid-Open No. H10-197954 is comprised of a transparent substrate and a film-like polarization element bonded to the transparent substrate.

A polarization plate absorbs one of a P-polarized light component and an S-polarized light component of light from a light source, and transmits the other one only. In the polarization plate, accordingly, the absorbed polarized light component is converted into a thermal component to generate heat. A method of cooling the heat generated in the polarization plate by a cooling fan is known.

In a cooling method disclosed in the Japanese Patent Application Laid-Open No. H10-197954, a cooling wind from a cooling fan disposed in a lower portion is passed through a space between the polarization plate and the transmission liquid crystal panel (namely, the space is used as a wind guiding path for guiding the wind from the cooling fan) such that the polarization plate and the transmission liquid crystal panel can be cooled. Further, there is a disclosure in the Japanese Patent Application Laid-Open No. H10-197954 that a wind-direction guiding portion is provided in the space between the polarization plate and the transmission liquid crystal panel, and the cooling wind from the cooling fan disposed in the lower portion is guided by the wind-direction guiding portion to be blown on a surface of the polarization plate (further a surface of the transmission liquid crystal panel), so that the polarization plate can be effectively cooled. Furthermore, there is a disclosure in the Japanese Patent Application Laid-Open No. H10-197954 that the cooling fan is disposed slantingly relative to the surface of the polarization plate, and the cooling wind from the cooling fan is thereby blown directly on the surface of the transmission liquid crystal panel and the surface of the polarization plate, so that the polarization plate can be effectively cooled.

In the Japanese Patent Application Laid-Open No. H9-288315, there is a disclosure that a wind guiding plate is disposed in a space between the polarization plate and the transmission liquid crystal panel, and the polarization plate is arranged a little slantingly relative to a surface of the transmission liquid crystal panel, so that the polarization plate can be effectively cooled.

On the other hand, Japanese Patent Application Laid-Open No. 2001-154268 discloses a liquid crystal projector using a reflection displaying device (a reflection liquid crystal panel).

Figure 8:
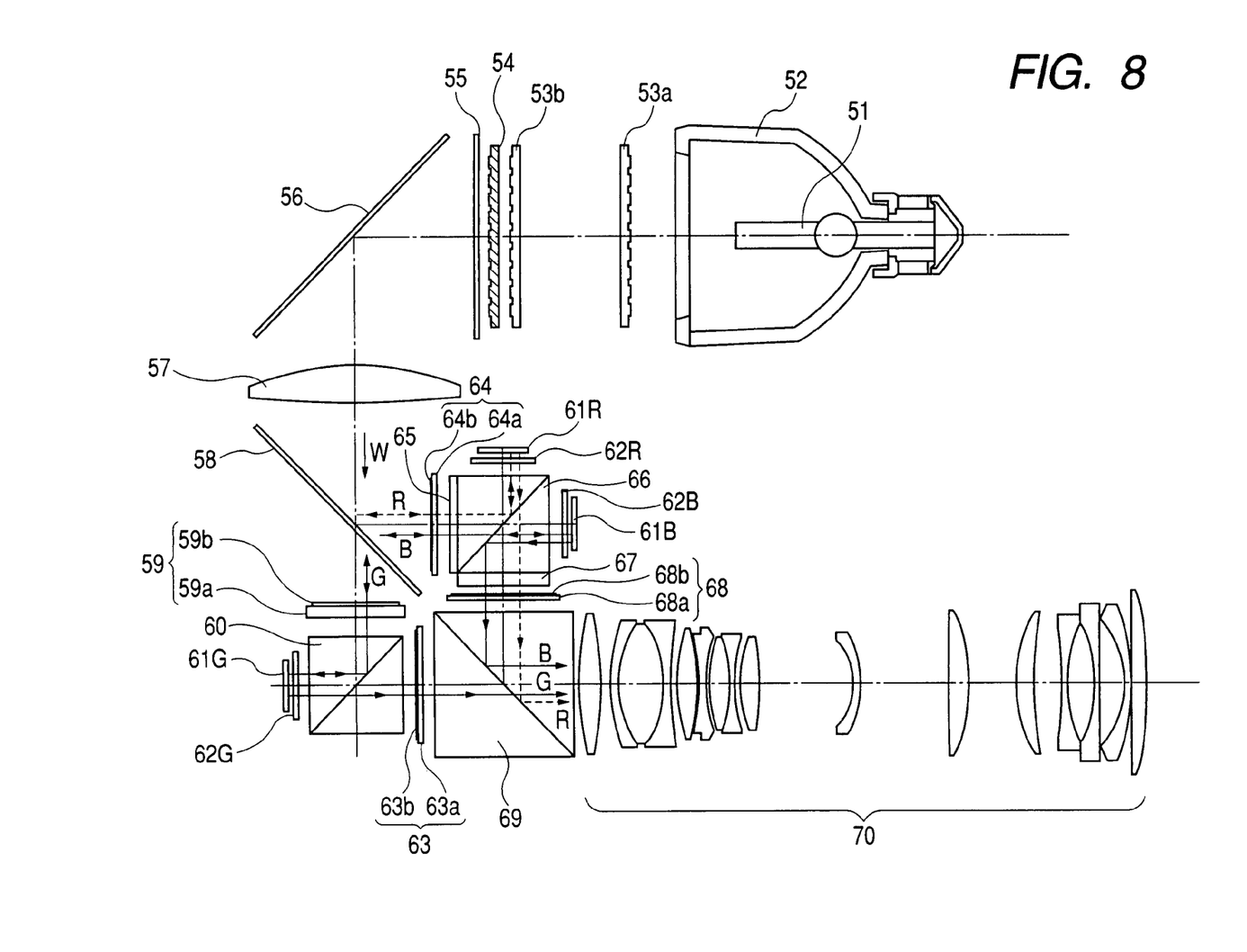
FIG. 8 is a view illustrating the structure of a conventional projection displaying apparatus using a reflection displaying device.

FIG. 8 illustrates the structure of a conventional liquid crystal projector using a reflection liquid crystal panel. In FIG. 8, reference numeral 58 denotes a dichroic mirror for transmitting therethrough light in a green (G) wavelength range (light in a first wavelength range), and reflecting light in red (R) and blue (B) wavelength ranges (light in a second wavelength range), out of white light emitted from a light source 51. A light-incident surface of the dichroic mirror 58 is set slantingly relative to the white light incident thereon at an angle of about 45 degrees.

Reference numeral 60 denotes a first polarization beam splitter with a polarization splitting face for transmitting therethrough a P-polarized light component, and reflecting an S-polarized light component. The polarization splitting face of the first polarization beam splitter 60 is interposed on an optical path of light in the first wavelength range between the dichroic mirror 58 and a green reflection liquid crystal panel 61G. Reference numeral 66 denotes a second polarization beam splitter with a polarization splitting face for transmitting therethrough a P-polarized light component, and reflecting an S-polarized light component. The polarization splitting face of the second polarization beam splitter 66 is interposed on an optical path of light in the second wavelength range between the dichroic mirror 58, and a red reflection liquid crystal panel 61R and a blue reflection liquid crystal panel 61B. On an incident side of the second polarization beam splitter 66, bonded is a color selective phase difference plate 65 that has a function of changing by 90 degrees a polarization direction of light in a blue (B) wavelength range only out of light in the second wavelength range.

Reference numeral 59 denotes a first incident-side polarization plate interposed on the optical path of light in the first wavelength range between the dichroic mirror 58 and the first polarization beam splitter 60. Further, reference numeral 64 denotes a second incident-side polarization plate interposed on the optical path of light in the second wavelength range between the dichroic mirror 58 and the second polarization beam splitter 66 (the color selective phase difference plate 65).

In the Japanese Patent Application Laid-Open No. 2001-154268, there is a disclosure that a space between the first incident-side polarization plate 59 and the first polarization beam splitter 60 and a space between the second incident-side polarization plate 64 and the second polarization beam splitter 66 (the color selective phase difference plate 65) are used as a wind guiding path for the cooling fan such that the polarization plate and the polarization beam splitter can be cooled.

A cooling method disclosed in the Japanese Patent Application Laid-Open No. H10-197954, however, has a problem that the cooling efficiency is not so high, because the polarization plate is gradually cooled from its lower portion to its overall plate by the cooling wind from the cooling fan provided in a lower portion. Further, though the cooling wind is blown on the surface of the polarization plate by the wind-direction guiding portion interposed in the space between the polarization plate and the transmission liquid crystal panel, a space for the wind-direction guiding portion is needed between the polarization plate and the transmission liquid crystal panel, leading to an increase in the size of an optical system. Furthermore, though the cooling wind is also blown on the surface of the polarization plate by arranging the cooling fan slantingly relative to the surface of the polarization plate, a space for a cooling portion is expanded due to the slant arrangement of the cooling fan, leading to an increase in the overall size of the apparatus.

Further, the cooling method disclosed in the Japanese Patent Application Laid-Open No. H9-288315 also has a problem that a space for the wind guiding plate is needed in a space between the polarization plate and the transmission liquid crystal panel, and the space is expanded due to the slant arrangement of the polarization plate, leading to an increase in the size of an optical system.

In the liquid crystal projector using the reflection liquid crystal panel disclosed in the Japanese Patent Application Laid-Open No. 2001-154268, large spaces (triangular spaces due to the 45-degree inclination of the dichroic mirror 58) are formed between the dichroic mirror 58 and the incident-side polarization plates 59 and 64, respectively, as illustrated in FIG. 8.

SUMMARY OF THE INVENTION

It is an object of the present invention to solve the above-discussed problems, and to prevent an increase in the size of an optical system or an apparatus while improving a cooling ability of cooling a polarization plate in a projection displaying apparatus using a reflection displaying device.

In order to achieve the above object, a projection displaying apparatus according to a first aspect of present invention includes the following arrangement.

That is, a projection displaying apparatus for projecting on a projection plane an image displayed on a reflection displaying device using light emitted from a light source includes:

a wind feeding portion for feeding a cooling wind to a light-incident side of a polarization plate disposed on an optical path from the light source to the reflection displaying device; and a wind guiding portion for guiding the cooling wind such that the cooling wind can be blown on the polarization plate slantingly relative to a light-incident face of the polarization plate.

In order to achieve the above object, a projection displaying apparatus according to a second aspect of the present invention includes the following arrangement.

That is, a projection displaying apparatus for projecting on a projection plane an image displayed on a reflection displaying device using light emitted from a light source includes:

a dichroic mirror for separating incident light into one-color light and two-color light, the dichroic mirror being disposed on an optical path from the light source to the reflection displaying device;

a wind feeding portion for feeding a cooling wind to a light-incident side of a polarization plate disposed on an optical path of the two-color light separated by the dichroic mirror; and a wind guiding portion for guiding the cooling wind such that the cooling wind can be blown on the polarization plate slantingly relative to a light-incident face of the polarization plate.

In order to achieve the above object, an optical system usable in a projection displaying apparatus according to a third aspect of the present invention includes the following arrangement.

That is, an optical system usable in a projection displaying apparatus for projecting on a projection plane an image displayed on a reflection displaying device using light emitted from a light source includes:

a wind feeding portion for feeding a cooling wind to a light-incident side of a polarization plate disposed on an optical path from the light source to the reflection displaying device; and a wind guiding portion for guiding the cooling wind such that the cooling wind can be blown on the polarization plate slantingly relative to a light-incident face of the polarization plate.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

Preferred embodiments of the present invention will now be described in detail in accordance with the accompanying drawings.

(First embodiment)

Figure 1:
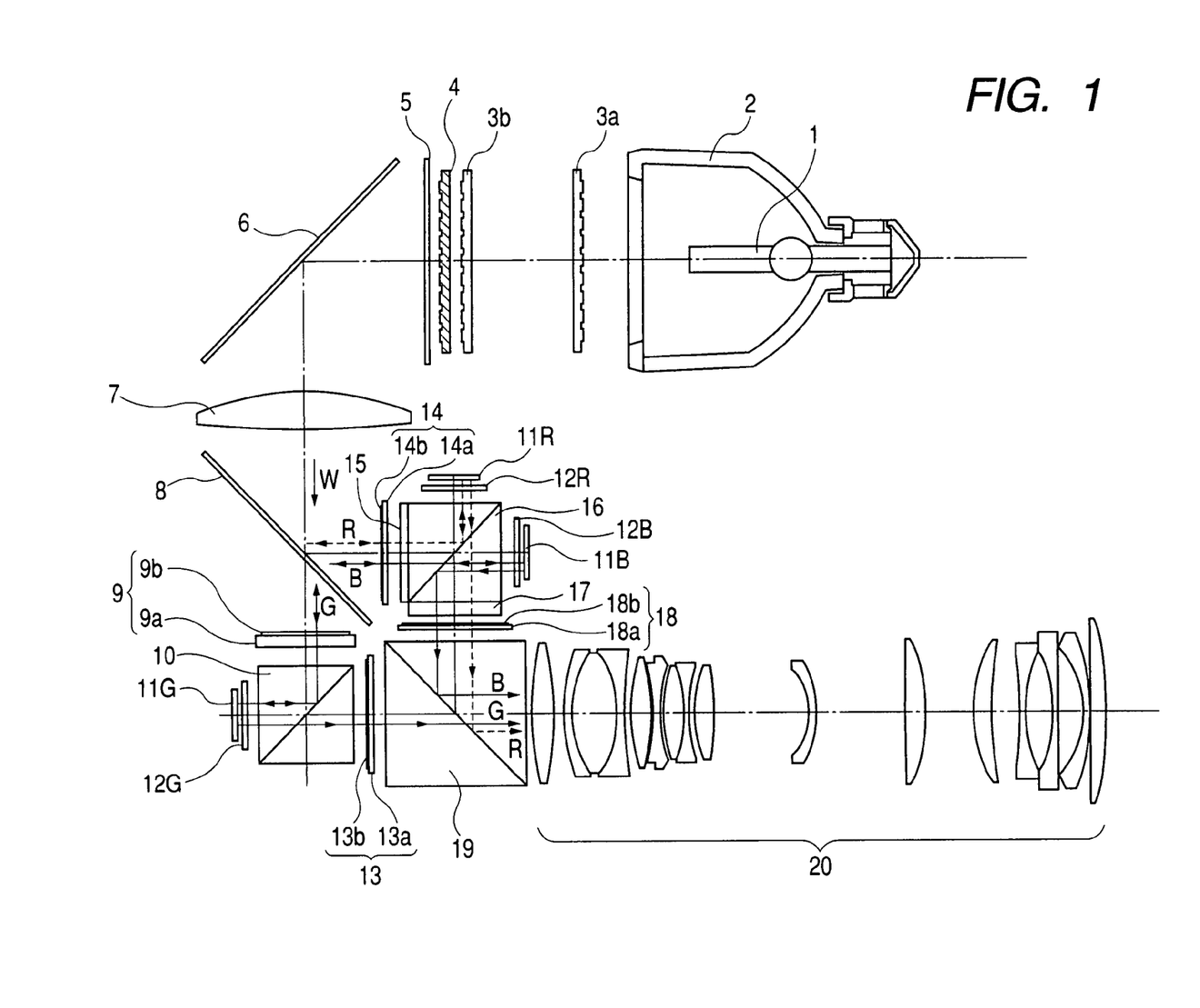
FIG. 1 is a view illustrating the structure of a projection displaying apparatus using a reflection displaying device according to a first embodiment of the present invention.

FIG. 1 is a view illustrating the structure of a projection displaying apparatus using a reflection displaying device according to a first embodiment of the present invention. Description will be initially made to the structure of a liquid crystal projector (a projection displaying apparatus) of the first embodiment with reference to FIG. 1.

In FIG. 1, reference numeral 1 denotes a light source for radiating white light in a continuous spectrum. Reference numeral 2 denotes a reflector for condensing light from the light source 1 in a predetermined direction. Reference numeral 3a denotes a first fly-eye lens comprised of square lenses arranged in the form of a matrix. Reference numeral 3b denotes a second fly-eye lens comprised of lenses that are arrayed corresponding to the lenses of the first fly-eye lens, respectively. Reference numeral 4 denotes a polarization converting element for converting non-polarized light into predetermined polarized light. Reference numeral 5 denotes a ultra-violet cut filter. Reference numeral 6 denotes a mirror. Reference numeral 7 denotes a condenser lens. Elements from the light source 1 to the condenser lens 7 constitute an illumination system.

Reference numeral 8 denotes a dichroic mirror for transmitting therethrough light in a green (G) wavelength range (light in a first wavelength range), and reflecting light in blue (B) and red (R) wavelength ranges (light in a second wavelength range). The dichroic mirror 8 is comprised of a parallel planar plate, and its light-incident face is disposed being inclined relative to incident light from the illumination system at an angle of about 45 degrees. The light-incident face of the dichroic mirror 8 transmits light in the first wavelength range therethrough and emits it in a direction approximately parallel to a light-incident direction, and reflects light in the second wavelength range and emits it in a direction approximately perpendicular to the light-incident direction.

Reference numeral 9 denotes a first incident-side polarization plate for green (G) light, which is comprised of a transparent substrate 9a and a polarization element 9b bonded thereto, and transmits therethrough an S-polarized light component only. Reference numeral 10 denotes a first polarization beam splitter (a prism) for transmitting a P-polarized light component therethrough, and reflecting an S-polarized light component. The first polarization beam splitter 10 includes a polarization splitting face. Reference numerals 11R, 11G and 11B denote reflection liquid crystal panels (reflection displaying elements) for red light, green light and blue light, respectively, each of which reflects and image-modulates light incident thereon.

Reference numerals 12R, 12G and 12B denote ¼ wavelength plates for red light, green light and blue light, respectively. Reference numeral 13 denotes a first emerging-side polarization plate for green (G) light, which is comprised of a transparent substrate 13a and a polarization element 13b bonded thereto, and transmits therethrough a P-polarized light component only.

Reference numeral 14 denotes a second incident-side polarization plate for red (R) light and blue (B) light, which is comprised of a transparent substrate 14a and a polarization element 14b bonded thereto, and transmits therethrough an S-polarized light component only. Reference numeral 15 denotes a first color selective phase-difference plate (a first color selective phase plate) for changing the polarization direction of blue (B) light by 90 degrees, and causing the polarization direction of red (R) light to remain unchanged. Reference numeral 16 denotes a second polarization beam splitter (a prism) for transmitting a P-polarized light component therethrough, and reflecting an S-polarized light component. The second polarization beam splitter 16 includes a polarization splitting face. Reference numeral 17 denotes a second color selective phase-difference plate (a second color selective phase plate) for changing the polarization direction of red (R) light by 90 degrees, and causing the polarization direction of blue (B) light to remain unchanged. The first color selective phase-difference plate 15 and the second color selective phase-difference plate 17 are bonded to the second polarization beam splitter 16.

Reference numeral 18 denotes a second emerging-side polarization plate for red (R) light and blue (B) light, which is comprised of a transparent substrate 18a and a polarization element 18b bonded thereto, and transmits therethrough an S-polarized light component only. Reference numeral 19 denotes a third polarization beam splitter (a color composition prism) for transmitting a P-polarized light component therethrough, and reflecting an S-polarized light component. The third polarization beam splitter 19 includes a polarization splitting face.

Elements from the dichroic mirror 8 to the third polarization beam splitter 19 constitute a color resolution and composition optical system.

Reference numeral 20 denotes a projection lens which constitutes a projection optical system.

The above-discussed illumination system, the color resolution and the composition optical system and projecting system constitute an optical system (an optical engine) for a projection displaying apparatus.

Description will now be made to an optical function of a liquid crystal projector (a projection displaying apparatus) of the first embodiment.

Light emitted by the light source 1 is condensed in a predetermined direction by the reflector 2. The reflector 2 has a parabolic face, and light from its focal point goes approximately parallel to a symmetrical axis of the parabolic face. The light source 1, however, is not an ideal point source, but has a finite size. Accordingly, a light beam converged by the reflector 2 contains much light component that is not parallel to the symmetrical axis of the parabolic face. The converged light beam then enters the first fly-eye lens 3a. The first fly-eye lens 3a is comprised of a plurality of square lenses having positive refractive power and assembled in the form of a matrix. Therefore, the incident light beam thereon is divided into plural light beams corresponding to the respective square lenses, and converged. A plurality of images of the light source 1 are thus formed near the polarization converting element 4 in the form of a matrix through the second fly-eye lens 3b.

The polarization converting element 4 is composed of a polarization splitting face, a reflective face and a half wavelength plate. A plurality of light beams converged in the form of a matrix are incident on the polarization splitting face corresponding to rows of the respective light beams, and are divided into light of transmitted P-polarized light components and light of reflected S-polarized light components, respectively. The light of reflected S-polarized light component is reflected by the reflective face, and emitted in the same direction as the P-polarized light components. In contrast, the light of transmitted P-polarized light components is transmitted through the ½ wavelength plate, and converted into the same polarization components as the S-polarized light components. Light thus emerges with its polarization direction being aligned.

After emitted from the polarization converting element 4, the thus-polarization-converted light beams are transmitted through the ultra-violet cut filter 5, and reflected by the mirror 6. The light beams thus reach the condenser lens 7 as a divergent light beam. Square images of the plural light beams are superimposed by the condenser lens 7 to form a square uniform illumination area. Each of reflection liquid crystal panels 11R, 11G and 11B described later is disposed at the illumination area.

The S-polarized light polarized by the polarization converting element 4 is then incident on the dichroic mirror 8. The dichroic mirror 8 reflects light of blue (B in a wavelength range between 430 nm and 495 nm) and red (R in a wavelength range between 590 nm and 650 nm), and transmits therethrough light of green (G in a wavelength range between 505 nm and 580 nm).

Description will now be made to an optical path of green (G) light. The light of G transmitted through the dichroic mirror 8 is incident on the first incident-side polarization plate 9. The light of G is S-polarized light even after subjected to resolution or separation by the dichroic mirror 8. After emerging from the first incident-side polarization plate 9, the light of G is incident on the first polarization beam splitter 10 as S-polarized light, and is reflected by the polarization splitting face. The light of G thus reaches the reflection liquid crystal panel 11G for green (G) light. The light of G is image-modulated and reflected by the reflection liquid crystal panel 11G for green (G) light. An S-polarized light component of the image-modulated reflected light of G is again reflected by the polarization splitting face of the first polarization beam splitter 10, and returned to the side of the light beam 1 without being projected.

On the other hand, a P-polarized light component of the image-modulated reflected light of G is transmitted through the polarization splitting face of the first polarization beam splitter 10, and directed to the third polarization beam splitter 19 as projection light. Here, under a condition in which all polarization components are converted into S-polarized light (a condition in which black is displayed), disturbances of polarization generated by the first polarization beam splitter 10 and the reflection liquid crystal panel 11G for green (G) light can be depressed by adjusting a phase delaying axis of the ¼ wavelength plate 12G, which is disposed between the first polarization beam splitter 10 and the reflection liquid crystal panel 11G for green (G) light, in a predetermined direction. The light of G emitted from the first polarization beam splitter 10 is analyzed by the first emerging-side polarization plate 13 for transmitting the rethrough a P-polarized light component only. The light hence becomes light whose unavailable component generated by passage through the first polarization beam splitter 10 and the reflection liquid crystal panel 11G for green (G) light is cut. The light of G is then incident on the third polarization beam splitter 19 as P-polarized light, and reaches a projecting lens 20 after transmitted through the polarization splitting face of the third polarization beam splitter 19.

Description will now be made to optical paths of red (R) and blue (B) light. The light of R and B reflected by the dichroic mirror 8 is incident on the second incident-side polarization plate 14. The light of R and B remains S-polarized light even after subjected to separation by the dichroic mirror 8. After emerging from the second incident-side polarization plate 14, the light of R and B is incident on the first color selective phase-difference plate 15. The first color selective phase-difference plate 15 has a function of rotating the polarization direction of blue (B) light only by 90 degrees. Accordingly, blue (B) light enters the second polarization beam splitter 16 as P-polarized light, while red (R) light enters the second polarization beam splitter 16 as S-polarized light. The red (R) light incident on the second polarization beam splitter 16 as S-polarized light is reflected by the polarization splitting face of the second polarization beam splitter 16, and reaches the reflection liquid crystal panel 11R for red (R) light. Further, the blue (B) light incident on the second polarization beam splitter 16 as P-polarized light is transmitted through the polarization splitting face of the second polarization beam splitter 16, and reaches the reflection liquid crystal panel 11B for blue (B) light.

The red (R) light incident on the reflection liquid crystal panel 11R for red (R) light is image-modulated and reflected. An S-polarized light component of the image-modulated reflected light of R is again reflected by the polarization splitting face of the second polarization beam splitter 16, and returned to the side of the light beam 1 without being projected. On the other hand, a P-polarized light component of the image-modulated reflected light of R is transmitted through the polarization splitting face of the second polarization beam splitter 16, and directed to the second color selective phase plate 17 as projection light.

Further, the blue (B) light incident on the reflection liquid crystal panel 11B for blue (B) light is image-modulated and reflected. A P-polarized light component of the image-modulated reflected light of B is again transmitted through the polarization splitting face of the second polarization beam splitter 16, and returned to the side of the light beam 1 with being removed from the projected light. On the other hand, an S-polarized light component of the image-modulated reflected light of B is reflected by the polarization splitting face of the second polarization beam splitter 16, and directed to the second color selective phase plate 17 as projection light.

Here, it is also possible to regulate black indications of R and B like the case of G by adjusting phase delaying axes of the ¼ wavelength plates 12R and 12B disposed between the second polarization beam splitter 16 and the reflection liquid crystal panels 11R and 11B for red (R) light and blue (B) light, respectively.

Light is thus composed into a single light beam, and the polarization direction of red (R) light of projection light of R and B emerging from the second polarization beam splitter 16 is rotated by 90 degrees by the second color selective phase plate 17. The red (R) light thus becomes an S-polarized light component, and analyzed by the second emerging-side polarization plate 18 to be incident on the third polarization beam splitter 19. The blue (B) light remains S-polarized, and is transmitted through the second color selective phase plate 17. The blue (B) light is further analyzed by the second emerging-side polarization plate 18 to be incident on the third polarization beam splitter 19. Unavailable components of projection light of R and B generated by passage through the second polarization beam splitter 16, the reflection liquid crystal displaying devices 11R and 11B for R and B, and the ¼ wavelength plates 12R and 12B are cut by analysis by the second emerging-side polarization plate 18.

Projection light of R and B incident on the third polarization beam splitter 19 is reflected by the polarization splitting face of the third polarization beam splitter 19, and is compounded with the above-discussed green (G) light transmitted trhough the polarization splitting face. The thus-compounded light reaches the projection lens 20. After that, the composite projection light of R, G and B is expanded and projected onto a projection plane, such as a screen, by the projection lens 20.

Here, the incident-side polarization plates 9 and 14 and the emerging-side polarization plate 13 and 18 absorb either one of P-polarized light and S-polarized light that is not analyzed. Such absorbed light becomes a heat component, and heat is generated. Especially in a liquid crystal projector using a reflection displaying device (a reflection liquid crystal panel), heat generation (exothermic) temperature of the incident-side polarization plates 9 and 14 is more likely to rise at the time of black indication than that of the emerging-side polarization plates 13 and 18.

An optical function at the time of black indication will be described using FIG. 1. In the first place, in the incident-side polarization plate 9, S-polarized light of green (G) light transmitted through the dichroic mirror 8 is incident on the first incident-side polarization plate 9, and it is thereafter incident on the first polarization beam splitter 10, and reflected by its polarization splitting face. Thus, this light reaches the reflection liquid crystal panel 11G for green (G) light. Here, at the time of black indication of the reflection liquid crystal panel 11G, the green (G) light is reflected without being image-modulated. Even after reflected by the reflection liquid crystal panel 11G, the green (G) light remains unchanged to be S-polarized light. Therefore, it is again reflected by the polarization splitting face of the first polarization beam splitter 10, and is transmitted through the first incident-side polarization plate 9 and returned to the side of the light source. This green (G) light is thus removed from the projection light. In other words, in the first incident-side polarization plate 9, green (G) light passes through it twice in going and returning, and accordingly it absorbs the P-polarized light component, that is not analyzed by the first incident-side polarization plate 9, twice. Therefore, the heat generation temperature of the incident-side polarization plate 9 is liable to be higher than that of the first emerging-side polarization plate 13.

In the second incident-side polarization plate 14, the S-polarized light components of red (R) and blue (B) light reflected by the dichroic mirror 8 ares incident on the second incident-side polarization plate 14. After emerging from the second incident-side polarization plate 14, red (R) and blue (B) light is incident on the first color selective phase-difference plate 15. The first color selective phase-difference plate 15 serves to change the polarization direction of blue (B) light only by 90 degrees. Accordingly, blue (B) light and red (R) light are incident on the second polarization beam splitter 16 as P-polarized light and S-polarized light, respectively. The red (R) light incident on the second polarization beam splitter 16 as S-polarized light is reflected by the polarization splitting face of the second polarization beam splitter 16, and reaches the reflection liquid crystal panel 11R for red (R) light.

Further, the blue (B) light incident on the second polarization beam splitter 16 as P-polarized light is transmitted through the polarization splitting face of the second polarization beam splitter 16, and reaches the reflection liquid crystal panel 11B for blue (B) light. Here, at the time of black indication of the reflection liquid crystal panel 11R for red (R) light, the red (R) light incident on the reflection liquid crystal panel 11R for red (R) light is reflected without being image-modulated. Even after reflected by the reflection liquid crystal panel 11R for red (R) light, the red (R) light remains unchanged to be S-polarized light. Therefore, it is again reflected by the polarization splitting face of the second polarization beam splitter 16, and is transmitted through the second incident-side polarization plate 14 to be returned to the side of the light source. The red (R) light is thus removed from the projection light.

On the other hand, the blue (B) light incident on the reflection liquid crystal panel 11B for blue (B) light is reflected without being image-modulated at the time of black indication of the reflection liquid crystal panel 11B for blue (B) light. Even after reflected by the reflection liquid crystal panel 11B for blue (B) light, the blue (B) light remains unchanged to be P-polarized light. Accordingly, the blue (B) light is again transmitted through the polarization splitting face of the second polarization beam splitter 16, and is converted into S-polarized light by the first color selective phase-difference plate 15. The blue (B) light is then transmitted through the second incident-side polarization plate 14, and is returned to the side of the light source. This blue (B) light is thus removed from the projection light. In other words, in the second incident-side polarization plate 14, red (R) light and blue (B) light pass through it twice in going and returning, and accordingly it absorbs P-polarized light components, that are not analyzed by the second incident-side polarization plate 14, twice. Therefore, the heat generation temperature of the second incident-side polarization plate 14 is liable to be higher than that of the second emerging-side polarization plate 18.

The second incident-side polarization plate 14 absorbs light components of red (R) light and blue (B) light that are not analyzed, so that its heat generation (exothermic) temperature is still higher than that of the first incident-side polarization plate 9.

Description will now be made to a structure for cooling the incident-side polarization plates 9 and 14 and the emerging-side polarization plates 13 and 18. In connection with the structure for cooling a polarization plate, it is possible to use a cooling fan, such as an axial-flow fan for feeding a wind in a direction of a rotational axis of the fan, or a sirocco fan for feeding a wind in a direction of a rotational tangent of the fan, as means for feeding a cooling wind. In the light of reduction in the size of an apparatus, it is more preferable to use a sirocco fan.

In the first place, as a method of cooling the first emerging-side polarization plate 13, winds are fed by a cooling fan (not shown) disposed in a lower portion to a space between the first polarization beam splitter 10 and the first emerging-side polarization plate 13 and a space between the first emerging-side polarization plate 13 and the third polarization beam splitter 19, respectively. Though a most portion of the cooling wind passes near central portions of the surfaces of the first emerging-side polarization plate 13 (the heat generation temperature of a polarization plate is highest at a place near a central portion of its surface), a side surface (a plate-thickness surface) of the first emerging-side polarization plate 13 is cooled thereby and the entire first emerging-side polarization plate 13 is gradually cooled.

Likewise, with respect to the second emerging-side polarization plate 18, winds are supplied by a cooling fan (not shown) disposed in the lower portion to a space between the second color selective phase plate 17 and the second emerging-side polarization plate 18 and a space between the second emerging-side polarization plate 18 and the third polarization beam splitter 19, respectively. Though a most portion of the cooling wind passes near central portions of the surfaces of the second emerging-side polarization plate 18 (the heat generation temperature of a polarization plate is highest at a place near a central portion of its surface), a side surface (a plate-thickness surface) of the second emerging-side polarization plate 18 is cooled thereby and the entire second emerging-side polarization plate 18 is gradually cooled.

However, the heat generation temperatures of the incident-side polarization plates 9 and 14 are likely to go higher than those of the emerging-side polarization plates 13 and 18 as discussed above, so that the cooling method for the emerging-side polarization plates 13 and 18 is unsatisfactory for the incident-side polarization plates 9 and 14 in cooling ability. Therefore, description will be made to a cooling method of the incident-side polarization plates 9 and 14, using FIG. 2.

Figure 2:
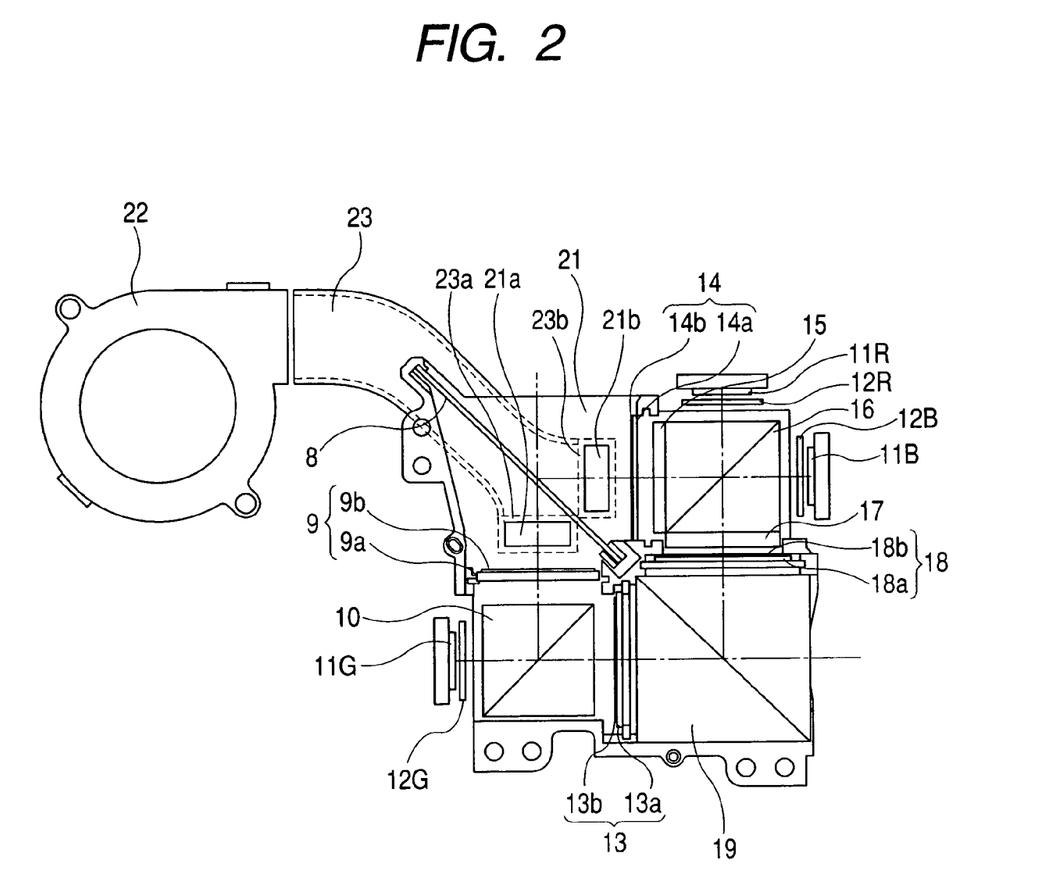
FIG. 2 is a view illustrating a cooling manner for cooling an incident-side polarization plate in the first embodiment.

In FIG. 2, the first incident-side polarization plate 9 is constructed by bonding the film-like polarization element 9b to the transparent substrate 9a as discussed above, and the incident-side polarization plate 9 is disposed with its polarization element 9b facing the side of the dichroic mirror 8. Thus, the polarization element 9b is bonded to a light-incident side of the transparent substrate 9a. Similarly, the second incident-side polarization plate 14 is constructed by bonding the polarization element 14b to the transparent substrate 14a as discussed above, and the incident-side polarization plate 14 is disposed with its polarization element 14b facing the side of the dichroic mirror 8. Thus, the polarization element 14b is bonded to a light-incident side of the transparent substrate 14a.

Each of the transparent substrates 9a and 14a is a parallel planar plate made of a material having a high thermal conductivity, such as glass, sapphire and fluorite. Since sapphire is a costly material, it is preferable to use a thin sapphire substrate only in the transparent substrate 14a disposed on the optical path of a two-color (R and B) side.

Further, the dichroic mirror 8 transmits green (G) light therethrough, and reflects red (R) light and blue (B) light to direct these light to the first polarization beam splitter 10 and the second polarization beam splitter 16, respectively. Accordingly, the dichroic mirror 8 is fixedly held by a first fixing member 21 together with the incident-side polarization plates 9 and 14, with being inclined relative to the incident-side polarization plates 9 and 14 at an angle of about 45 degrees. In other words, on optical paths between the dichroic mirror 8 and the polarization beam splitters 10 and 16, there are formed large spaces expanding toward the light-incident sides at approximately 45-degree opening angles viewed from the polarization beam splitters 10 and 16, respectively.

In FIG. 2, reference numeral 22 denotes a sirocco fan for feeding a cooling wind to light-incident sides of the first incident-side polarization plate 9 and the second incident-side polarization plate 14. Reference numeral 23 denotes a duct acting as means for guiding the cooling wind from the sirocco fan 22. The duct 23 is provided with blast ports 23a and 23b for causing the cooling wind to be blown on surfaces near central portions of the first incident-side polarization plate 9 and the second incident-side polarization plate 14, respectively. Further, the first fixing member 21 is provided with blowing ports 21a and 21b located in the above-discussed about-45-degree spaces, respectively. The about-45-degree space is a space needed in designing an optical system of a liquid crystal projector using a reflection liquid crystal panel, but not a space intentionally provided such that the blast ports 23a and 23b and the blowing ports 21a and 21b can be formed in the duct 23 and the first fixing member 21, respectively.

Figure 3A:
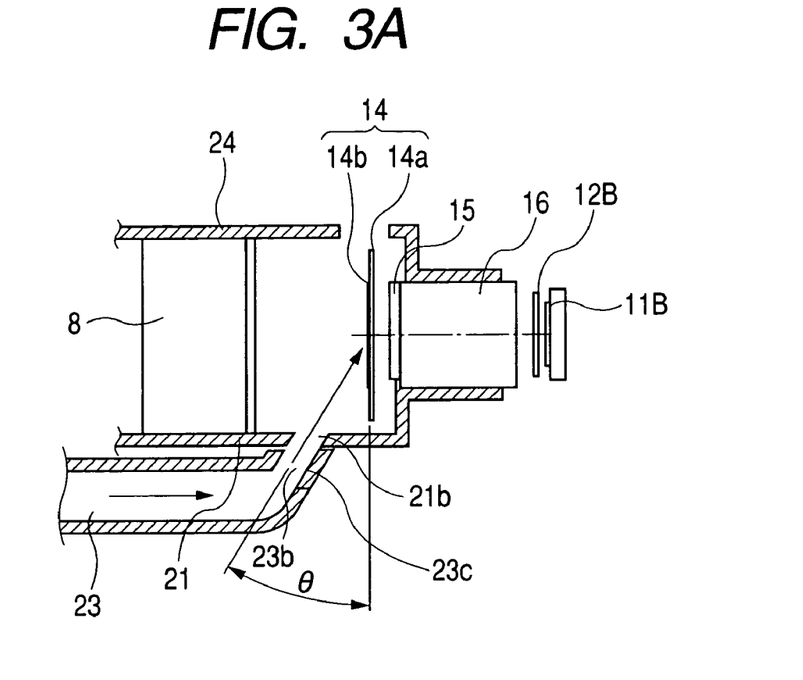
FIG. 3A is a view illustrating a cooling structure for cooling the incident-side polarization plate in the first embodiment.
Figure 3B:
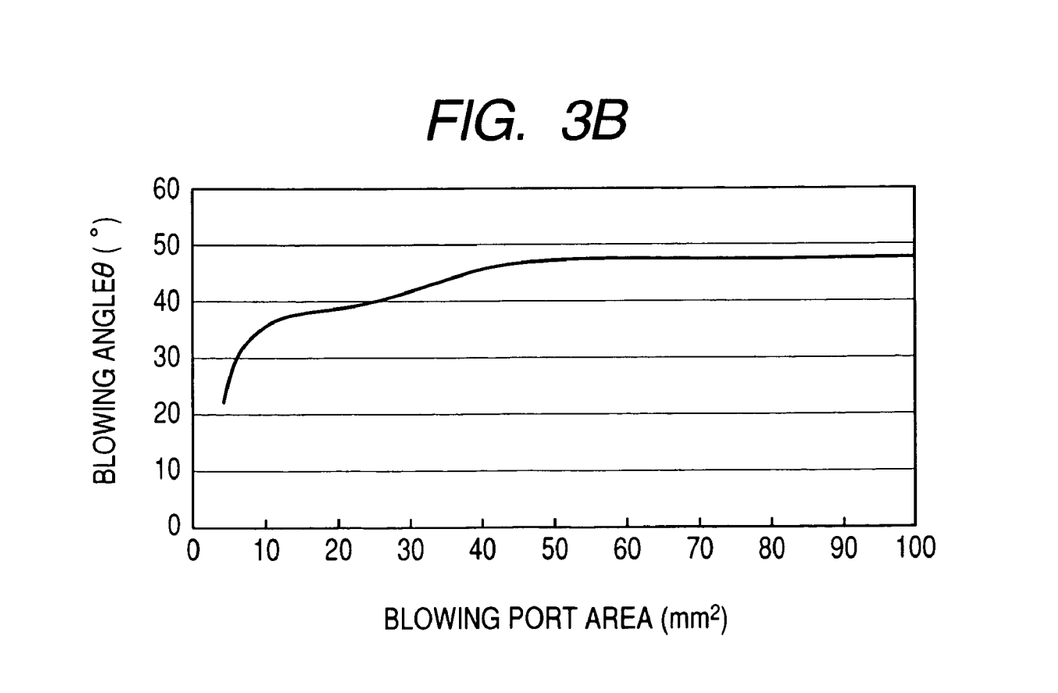
FIG. 3B is a graph showing the relationship between an area of a blowing port and a blowing angle of a cooling wind in the first embodiment.

Description will be next made to a flow of the cooling wind from the sirocco fan 22, using FIGS. 3A and 3B. Although FIG. 3A illustrates a cooling structure for cooling the second incident-side polarization plate 14 only, a cooling structure for cooling the first incident-side polarization plate 9 is the same therewith. In FIG. 3A, reference numeral 24 denotes a second fixing member for covering the first fixing member 21 in a state in which optical elements of the dichroic mirror 8, the incident-side polarization plate 14 and the like are contained.

Upon rotation of the sirocco fan 22, the cooling wind flows in the duct 23 rightward of FIG. 3A, is blown on a tapering portion 23c provided in the duct 23, and is guided with its direction being inclined at an angle θ relative to the surface of the incident-side polarization plate 14 so as to be blown on a portion near the central portion of the incident-side polarization plate 14. The cooling wind reaches the surface near the central portion of the incident-side polarization plate 14 through the blast port 23b of the duct 23 and the blowing port 21b of the first fixing member 21.

The incident-side polarization plate 14 is disposed such that the polarization element 14b bonded to the transparent substrate 14a can face the side of the dichroic mirror 8. Accordingly, the polarization element 14b can be directly cooled, and an effective cooling can be achieved. Further, the cooling wind accurately reaches the surface near the central portion of the incident-side polarization plate 14, whose heat generation temperature is likely to increase, so that the cooling ability can be drastically improved. It is further possible to effectively employ the space (the about-45-degree space) between the dichroic mirror 8 and the incident-side polarization plate 14, that is required in designing the optical system, so that the size of the apparatus can be largely reduced. Furthermore, due to the increase in the cooling ability, cooling can be achieved even if the number of rotation and the amount of wind of the sirocco fan are decreased, leading to reduction of noises.

Here, in a liquid crystal projector using a liquid crystal panel having a size of below one (1) inch, the area of the blowing port 21b (i.e., the area of the blast port 23b in the duct 23) in the first fixing member 21 used for cooling the polarization plate is generally set to below 100 square millimeters.

In the first embodiment, simulation is performed with respect to a condition in which the temperature of the incident-side polarization plate 14 becomes lowest, using the area of the blowing port 21b in the first fixing member 21 and the angle (the blowing angle θ) of the cooling wind blown on the surface near the central portion of the incident-side polarization plate 14, as parameters. FIG. 3B shows data of that simulation. It can be known from FIG. 3B that a range of the blowing angle θ is preferably from 20 degrees to 50 degrees when the area of the blowing port 21b in the first fixing member 21 is below 100 square millimeters. Further, it can be seen from FIG. 3B that a preferable blowing angle θ is approximately uniform and about 47 degrees when the area of the blowing port 21b is in a range between 50 square millimeters and 100 square millimeters, and the blowing angle θ is preferably about 50 degrees when the area of the blowing port 21b is over 100 square millimeters (the area of the blowing port 21b cannot be so increased for the purposes of reducing the size of the apparatus).

With respect to the first incident-side polarization plate 9, the cooling wind from the sirocco fan 22 flows in the duct 23, and reaches the surface near the central portion of the first incident-side polarization plate 9 through the blast port 23a in the duct 23 and the blowing port 21a in the first fixing member 21. Also in this case, a preferable range of the blowing angle of the cooling wind is likewise from 20 degrees to 50 degrees.

Figure 4:
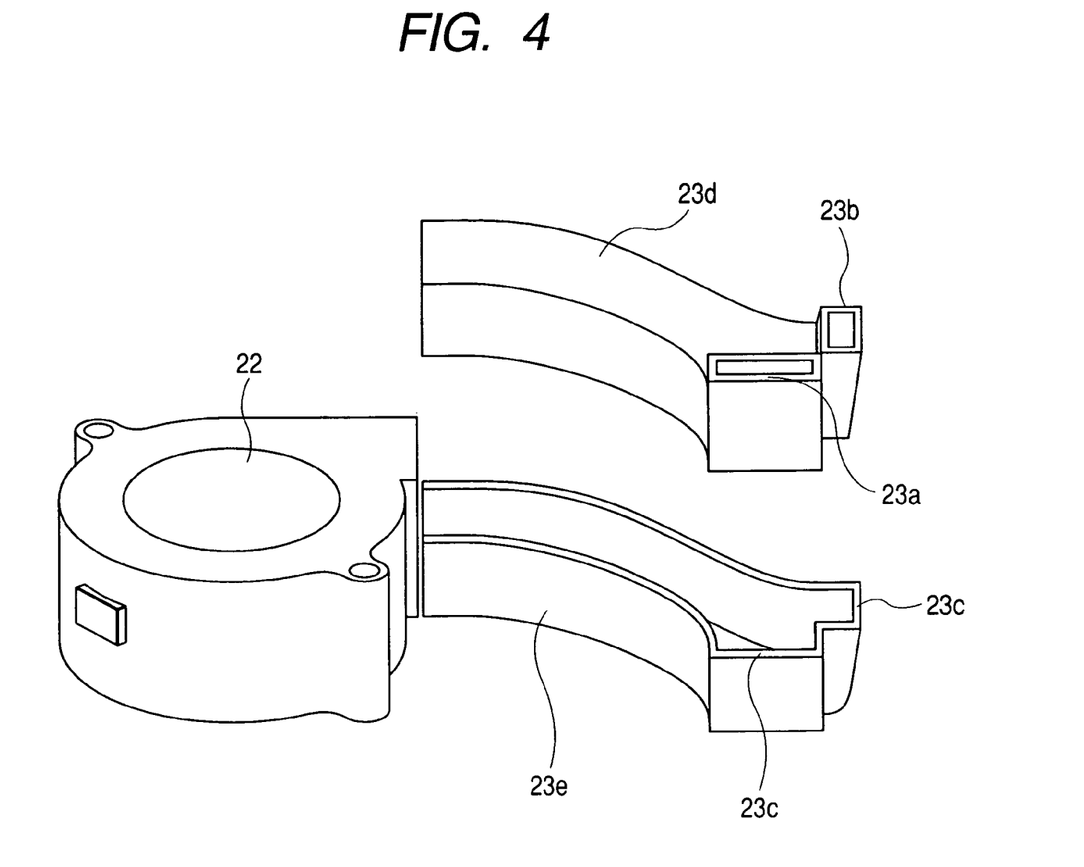
FIG. 4 is a view illustrating a wind feeding means in the first embodiment.

The structure of wind feeding means (the sirocco fan 22 and the duct 23) will next be described with reference to FIG. 4. In FIG. 4, the duct 23 is comprised of an upper duct portion 23d and a lower duct portion 23e. The upper duct portion 23d is provided with blast ports 23a and 23b. The tapering portion 23c for changing the direction of the cooling wind from the sirocco fan 22 is formed when the upper duct portion 23d and the lower duct portion 23e are bonded to each other.

(Second Embodiment)

Figure 5:
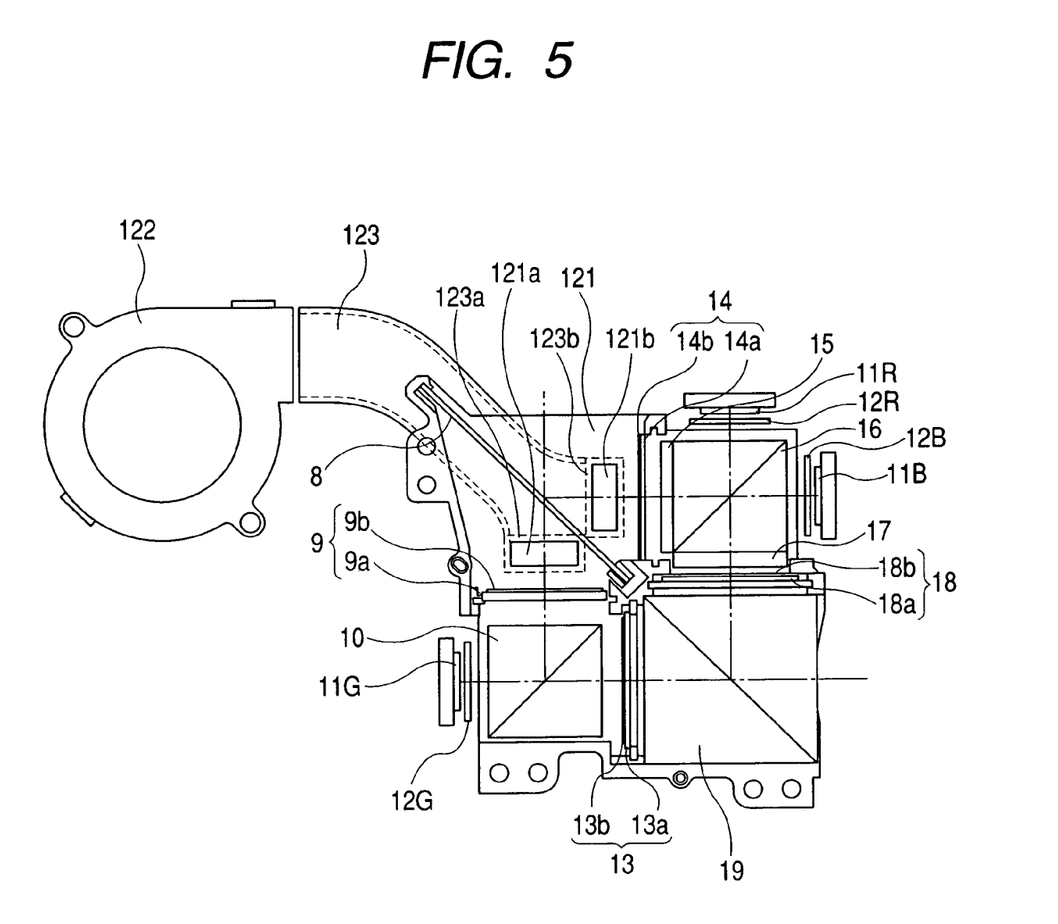
FIG. 5 is a view illustrating a cooling manner for cooling an incident-side polarization plate in a second embodiment.

FIG. 5 illustrates a cooling structure for cooling the incident-side polarization plates 9 and 14 in a second embodiment.

In FIG. 5, the first incident-side polarization plate 9 is constructed by bonding the polarization element 9b to the transparent substrate 9a as discussed above, and the incident-side polarization plate 9 is disposed with its bonded polarization element 9b facing the side of the dichroic mirror 8. Similarly, the second incident-side polarization plate 14 is constructed by bonding the polarization element 14b to the transparent substrate 14a as discussed above, and the incident-side polarization plate 14 is disposed with its bonded polarization element 14b facing the side of the dichroic mirror 8.

Further, the dichroic mirror 8 transmits green (G) light therethrough, and reflects red (R) light and blue (B) light to feed these light to the first polarization beam splitter 10 and the second polarization beam splitter 16, respectively. Accordingly, the dichroic mirror 8 is fixedly held by a first fixing member 121 together with the incident-side polarization plates 9 and 14, with being inclined relative to the incident-side polarization plates 9 and 14 at an angle of approximately 45 degrees. In other words, on optical paths between the dichroic mirror 8 and the polarization beam splitters 10 and 16, there are formed large spaces expanding toward the light-incident sides at approximately 45-degree opening angles viewed from the polarization beam splitters 10 and 16, respectively.

In FIG. 5, reference numeral 122 denotes a sirocco fan for feeding cooling winds to light-incident sides of the first incident-side polarization plate 9 and the second incident-side polarization plate 14, respectively. Reference numeral 123 denotes a duct acting as a means for guiding the cooling wind from the sirocco fan 122. The duct 123 is provided with blast ports 123a and 123b for causing the cooling winds to be blown on surfaces near central portions of the first incident-side polarization plate 9 and the second incident-side polarization plate 14, respectively. The first fixing member 121 is provided with blowing ports 121a and 121b located in the above-discussed about-45-degree spaces, respectively. The about-45-degree space is a space needed in designing an optical system of a liquid crystal projector using a reflection liquid crystal panel, but not a space intentionally provided such that the blast ports 123a and 123b and the blowing ports 121a and 121b can be formed in the duct 123 and the first fixing member 121, respectively.

The second embodiment is different from the first embodiment in that the area of the blast port 123b in the duct 123 (the blowing port 121b in the first fixing member 121) is largely set relatively to the area of the blast port 123a in the duct 123 (the blowing port 121a in the first fixing member 121).

The reason for that is that the second incident-side polarization plate 14 absorbs light components of red (R) light and blue (B) light that are not analyzed as discussed above, so that its heat generation (exothermic) temperature is still higher than that of the first incident-side polarization plate 9 through which only green (G) light is transmitted. Accordingly, the area of the blast port 123b in the duct 123 (the blowing port 121b in the first fixing member 121) is largely set, as compared with the area of the blast port 123a in the duct 123 (the blowing port 121a in the first fixing member 121), thereby increasing a wind pressure of the cooling wind from the sirocco fan at a portion of the blast port 123a (the blowing port 121a) having a smaller area. That is, the cooling wind becomes difficult to flow thereat, and the amount of the cooling wind decreases. In contrast therewith, the amount of the cooling wind increases at a portion of the blast port 123b (the blowing port 121b) having a larger area. It is hence possible to raise the cooling ability for the second incident-side polarization plate 14 more than the cooling ability for the first incident-side polarization plate 9.

With respect to the flow of the cooling wind from the sirocco fan 122 and the blowing angle of the cooling wind, these are the same as those of the first embodiment.

(Third Embodiment)

Figure 6:
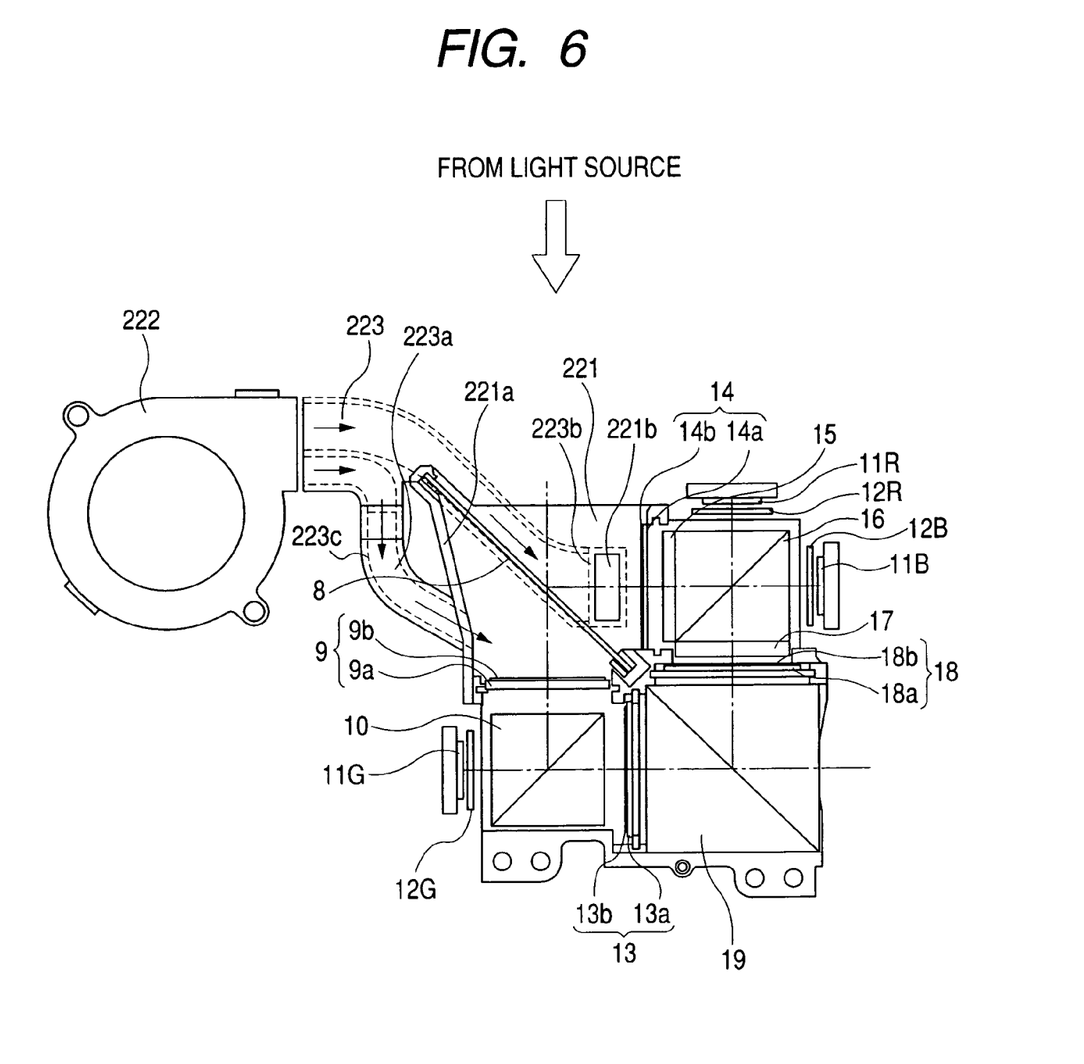
FIG. 6 is a view illustrating a cooling manner for cooling an incident-side polarization plate in a third embodiment.

FIG. 6 illustrates a cooling structure for cooling the incident-side polarization plates 9 and 14 in a third embodiment.

In FIG. 6, the first incident-side polarization plate 9 is constructed by bonding the polarization element 9b to the transparent substrate 9a as discussed above, and the incident-side polarization plate 9 is disposed with its bonded polarization element 9b facing the side of the dichroic mirror 8. Similarly, the second incident-side polarization plate 14 is constructed by bonding the polarization element 14b to the transparent substrate 14a as discussed above, and the incident-side polarization plate 14 is disposed with its bonded polarization element 14b facing the side of the dichroic mirror 8.

Further, the dichroic mirror 8 transmits green (G) light therethrough, and reflects red (R) light and blue (B) light to feed these light to the first polarization beam splitter 10 and the second polarization beam splitter 16, respectively. Accordingly, the dichroic mirror 8 is fixedly held by a first fixing member 221 together with the incident-side polarization plates 9 and 14, with being inclined relative to the incident-side polarization plates 9 and 14 at an angle of approximately 45 degrees. In other words, on optical paths between the dichroic mirror 8 and the polarization beam splitters 10 and 16, there are formed large spaces expanding toward light-incident sides at approximately 45-degree opening angles viewed from the polarization beam splitters 10 and 16, respectively.

In FIG. 6, reference numeral 222 denotes a sirocco fan for feeding cooling winds to light-incident sides of the first incident-side polarization plate 9 and the second incident-side polarization plate 14, respectively. Reference numeral 223 denotes a duct acting as a means for guiding the cooling wind from the sirocco fan 222. The duct 223 is provided with a side blast port 223a formed on its side face and a bottom blast port 223b formed on its bottom face for causing the cooling winds to be blown on surfaces near central portions of the first incident-side polarization plate 9 and the second incident-side polarization plate 14, respectively. The first fixing member 221 is provided with a side blowing port 221a formed on its side face and a bottom blowing port 221b formed on its bottom face, each being located in the above-discussed about-45-degree space. The about-45-degree space is a space needed in designing an optical system of a liquid crystal projector using a reflection liquid crystal panel, but not a space intentionally provided such that the side and bottom blast ports 223a and 223b and the side and bottom blowing ports 221a and 221b can be formed in the duct 223 and the first fixing member 221, respectively.

In the third embodiment, the cooling wind is fed to the first incident-side polarization plate 9 in an approximately horizontal direction, while fed to the second incident-side polarization plate 14 in an approximately vertical direction but not an approximately horizontal direction. The reason for that is that though light from the light source enters the dichroic mirror 8 in a direction indicated by an arrow of FIG. 6, light from the light source is partly intercepted if the construction is built such that the cooling wind is fed to the second incident-side polarization plate 14 in the approximately horizontal direction.

Description will be next made to a flow of the cooling wind from the sirocco fan 222, using FIG. 6. Upon rotation of the sirocco fan 222, the cooling wind flows toward two places of the side blast port 223a (for cooling the first incident-side polarization plate 9) and the bottom blast port 223b (for cooling the second incident-side polarization plate 14). The flow of the wind directed to the bottom blowing port 223b (for cooling the second incident-side polarization plate 14) in the duct 223 of this embodiment is the same as that of the first embodiment, so that description thereof is omitted.

The cooling wind directed toward the side blast port 223a (for cooling the first incident-side polarization plate 9) in the duct 223 is blown on a tapering portion 223c provided in the duct 223, and its wind direction is changed such that the cooling wind can be blown on a portion near the central portion of the first incident-side polarization plate 9. The cooling wind thus reaches the surface near the central portion of the first incident-side polarization plate 9 through the side blast port 223a formed in the duct 223, and the side blowing port 221a formed in the first fixing member 221.

The first incident-side polarization plate 9 is disposed such that the polarization element 9b bonded to the transparent substrate 9a can face the side of the dichroic mirror 8. Accordingly, the polarization element 9b can be directly cooled, and an effective cooling can be achieved. Further, the cooling wind can accurately reach the surface near the central portion of the first incident-side polarization plate 9, whose heat generation temperature is likely to increase, so that the cooling ability can be drastically improved. It is further possible to effectively employ the space (the about-45-degree space) between the dichroic mirror 8 and the first incident-side polarization plate 9, that is needed in designing the optical system, so that the size of the apparatus can be largely reduced. Furthermore, due to the increase in the cooling ability, cooling can be achieved even if the number of rotation and the amount of wind of the sirocco fan are decreased, leading to reduction of noises.

Figure 7:
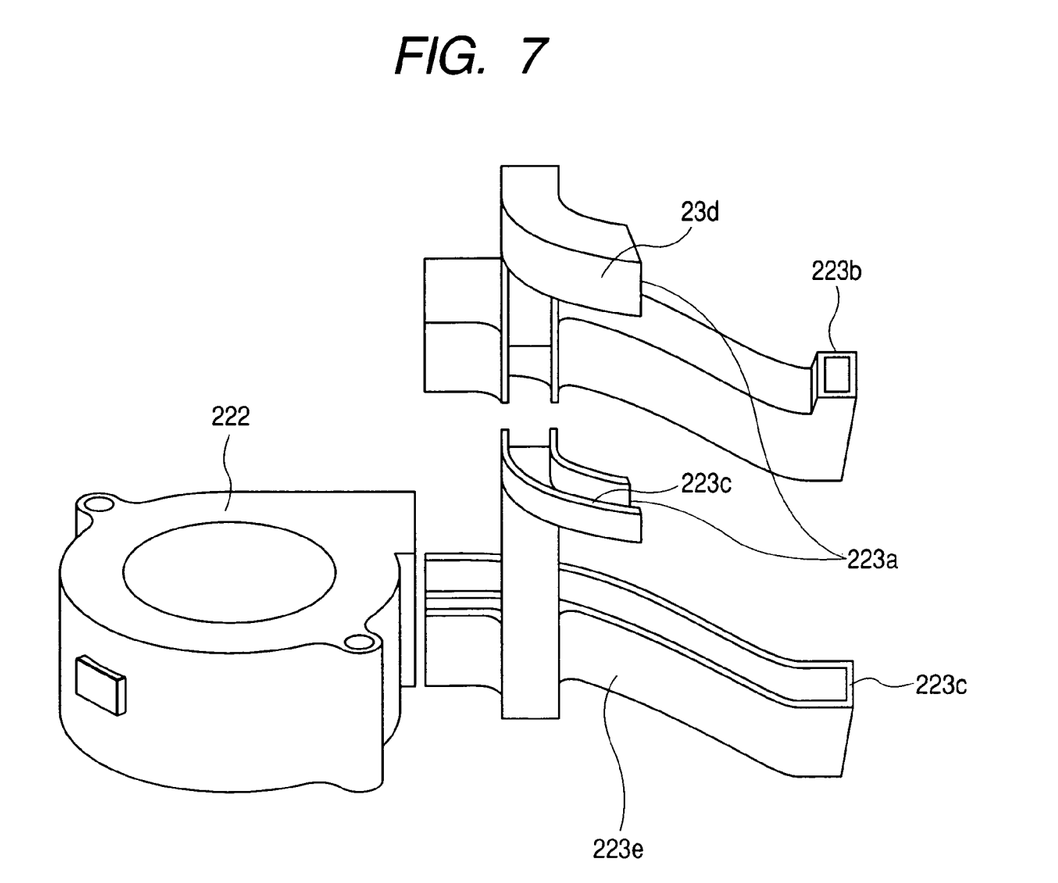
FIG. 7 is a view illustrating a wind feeding means in the third embodiment.

The structure of a wind feeding means (the sirocco fan 222 and the duct 223) will next be described with reference to FIG. 7. In FIG. 7, the duct 223 is comprised of an upper duct portion 223d and a lower duct portion 223e. The upper duct portion 223d is provided with the bottom blast port 223b. The tapering portion 223c for changing the direction of the cooling wind from the sirocco fan 222, and the side blast port 223a are formed when the upper duct portion 223d and the lower duct portion 223e are bonded to each other. The blowing angle of the cooling wind in the third embodiment is the same as that of the first embodiment, so that description thereof is omitted.

As described in the foregoing, according to the present invention, it is possible to prevent an increase in the size of an optical system or an apparatus while improving a cooling ability of a polarization plate in a projection displaying apparatus using a reflection displaying device.

When a projection displaying apparatus of either one of the first to third embodiments is combined with an image signal supplying apparatus (for example, a personal computer, a video camera, or a digital camera) for supplying an image signal to this projection displaying apparatus, it is possible to provided an image projecting system preferably usable in a conference, an explanation delivering meeting, a picture delivering meeting and the like. Communications between the projection displaying apparatus and the image signal supplying apparatus can be carried out through a communication cable or a wireless LAN system.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2003-356632 filed on Oct. 16, 2003, which is hereby incorporated by reference herein.

What is claimed is:

1. A projection displaying apparatus for projecting on a projection plane an image displayed on a reflection displaying device using light emitted from a light source, said projection displaying apparatus comprising:
   a wind feeding portion for feeding a cooling wind to a light-incident side of a polarization plate disposed on an optical path from the light source to the reflection displaying device; and
   a wind guiding portion for guiding the cooling wind such that the cooling wind can be blown on the polarization plate slantingly relative to a light-incident face of the polarization plate,
   wherein the wind guiding portion is adapted to guide the cooling wind such that the cooling wind can be blown on the polarization plate with being inclined relative to the light-incident face of the polarization plate at an angle in a range from 20 degrees to 50 degrees.

2. A projection displaying apparatus according to claim 1, wherein the wind guiding portion is adapted to guide the cooling wind such that the cooling wind can be blown on a portion around a central portion of the polarization plate.

3. A projection displaying apparatus according to claim 1, further comprising a dichroic mirror for emitting light in a first wavelength range out of incident light toward a direction approximately parallel to a direction of the incident light, and emitting light in a second wavelength range out of the incident light toward a direction approximately perpendicular to the direction of the incident light.

4. A projection displaying apparatus according to claim 3, wherein the dichroic mirror is a parallel planar plate, and a light-incident face of the dichroic mirror is disposed being inclined relative to the incident light at an angle of about 45 degrees.

5. A projection displaying apparatus according to claim 3, wherein the polarization plate includes a first polarization plate provided on an optical path of the light in the first wavelength range, and a second polarization plate provided on an optical path of the light in the second wavelength range, and the wind feeding portion includes a first wind feeding portion for feeding a cooling wind to a light-incident side of the first polarization plate, and a second wind feeding portion for feeding a cooling wind to a light-incident side of the second polarization plate.

6. A projection displaying apparatus according to claim 5, wherein the amount of the cooling wind fed to the light-incident side of the polarization plate provided on the optical path of light in a larger wavelength range out of the first wavelength range and the second wavelength range is set larger than the amount of the cooling wind fed to the light-incident side of the polarization plate provided on the optical path of light in a smaller wavelength range out of the first wavelength range and the second wavelength range.

7. A projection displaying apparatus according to claim 5, wherein the wind feeding portion includes a cooling wind generator for generating a cooling wind, a first blast port for blowing the cooling wind on the light-incident side of the first polarization plate, and a second blast port for blowing the cooling wind on the light-incident side of the second polarization plate, and an area of the blast port for blowing the cooling wind on the light-incident side of the polarization plate provided on the optical path of light in a larger wavelength range out of the first wavelength range and the second wavelength range is set larger than an area of the blast port for blowing the cooling wind on the light-incident side of the polarization plate provided on the optical path of light in a smaller wavelength range out of the first wavelength range and the second wavelength range.

8. A projection displaying apparatus according to claim 5, wherein the first wind feeding portion is adapted to feed the cooling wind in an approximately horizontal direction, and the second wind feeding portion is adapted to feed the cooling wind in an approximately vertical direction.

9. A projection displaying apparatus according to claim 1, wherein the polarization plate includes a substrate formed of glass, sapphire, or fluorite, and a polarization element bonded to a light-incident side of the substrate.

10. An image projecting system comprising:
- a projection displaying apparatus recited in claim 1; and
- an image-signal supplying apparatus for supplying an image signal to the projection displaying apparatus.

11. A projection displaying apparatus for projecting on a projection plane an image displayed on a reflection displaying device using light emitted from a light source, said projection displaying apparatus comprising:
- a wind feeding portion for feeding a cooling wind to a light-incident side of a polarization plate disposed on an optical path from the light source to the reflection displaying device;
- a wind guiding portion for guiding the cooling wind such that the cooling wind can be blown on the polarization plate slantingly relative to a light-incident face of the polarization plate; and
- a dichroic mirror for emitting light in a first wavelength range out of incident light toward a direction approximately parallel to a direction of the incident light, and emitting light in a second wavelength range out of the incident light toward a direction approximately perpendicular to the direction of the incident light,
- wherein the polarization plate includes a first polarization plate provided on an optical path of the light in the first wavelength range, and a second polarization plate provided on an optical path of the light in the second wavelength range, and the wind feeding portion includes a first wind feeding portion for feeding a cooling wind to a light-incident side of the first polarization plate, and a second wind feeding portion for feeding a cooling wind to a light-incident side of the second polarization plate, and
- wherein the amount of the cooling wind fed to the light-incident side of the polarization plate provided on the optical path of light in a larger wavelength range out of the first wavelength range and the second wavelength range is set larger than the amount of the cooling wind fed to the light-incident side of the polarization plate provided on the optical path of light in a smaller wavelength range out of the first wavelength range and the second wavelength range.

12. A projection displaying apparatus for projecting on a projection plane an image displayed on a reflection displaying device using light emitted from a light source, said projection displaying apparatus comprising:
- a wind feeding portion for feeding a cooling wind to a light-incident side of a polarization plate disposed on an optical path from the light source to the reflection displaying device;
- a wind guiding portion for guiding the cooling wind such that the cooling wind can be blown on the polarization plate slantingly relative to a light-incident face of the polarization plate; and
- a dichroic mirror for emitting light in a first wavelength range out of incident light toward a direction approximately parallel to a direction of the incident light, and emitting light in a second wavelength range out of the incident light toward a direction approximately perpendicular to the direction of the incident light,
- wherein the polarization plate includes a first polarization plate provided on an optical path of the light in the first wavelength range, and a second polarization plate provided on an optical path of the light in the second wavelength range, and the wind feeding portion includes a first wind feeding portion for feeding a cooling wind to a light-incident side of the first polarization plate, and a second wind feeding portion for feeding a cooling wind to a light-incident side of the second polarization plate, and
- wherein the wind feeding portion includes a cooling wind generator for generating a cooling wind, a first blast port for blowing the cooling wind on the light-incident side of the first polarization plate, and a second blast port for blowing the cooling wind on the light-incident side of the second polarization plate, and an area of the blast port for blowing the cooling wind on the light-incident side of the polarization plate provided on the optical path of light in a larger wavelength range out of the first wavelength range and the second wavelength range is set larger than an area of the blast port for blowing the cooling wind on the light-incident side of the polarization plate provided on the optical path of light in a smaller wavelength range out of the first wavelength range and the second wavelength range.

* * * * *

UNITED STATES PATENT AND TRADEMARK OFFICE
CERTIFICATE OF CORRECTION

PATENT NO. : 7,118,223 B2 Page 1 of 1
APPLICATION NO. : 10/964328
DATED : October 10, 2006
INVENTOR(S) : Ryuji Suzuki It is certified that error appears in the above-identified patent and that said Letters Patent is hereby corrected as shown below:

Column 7, line 30-31, delete " transmitting the rethrough " and insert -- transmitting therethrough --

Signed and Sealed this

Fourth Day of September, 2007

JON W. DUDAS
*Director of the United States Patent and Trademark Office*